United States Patent
Sambandan et al.

(10) Patent No.: US 11,511,267 B2
(45) Date of Patent: Nov. 29, 2022

(54) ULTRAVIOLET ACTIVATED PHOTOCATALYTIC MATERIALS; THEIR USE IN VOLATILE COMPOUND DECOMPOSITION

(71) Applicant: NITTO DENKO CORPORATION, Osaka (JP)

(72) Inventors: Ekambaram Sambandan, Carlsbad, CA (US); Bin Zhang, San Diego, CA (US)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 17/252,253

(22) PCT Filed: Jun. 24, 2019

(86) PCT No.: PCT/US2019/038652
§ 371 (c)(1),
(2) Date: Dec. 14, 2020

(87) PCT Pub. No.: WO2020/005798
PCT Pub. Date: Jan. 2, 2020

(65) Prior Publication Data
US 2021/0260569 A1 Aug. 26, 2021

Related U.S. Application Data

(60) Provisional application No. 62/725,104, filed on Aug. 30, 2018, provisional application No. 62/690,777, filed on Jun. 27, 2018.

(51) Int. Cl.
*B01J 35/00* (2006.01)
*B01D 53/86* (2006.01)
(Continued)

(52) U.S. Cl.
CPC ........ *B01J 35/004* (2013.01); *B01D 53/8687* (2013.01); *B01J 21/063* (2013.01);
(Continued)

(58) Field of Classification Search
None
See application file for complete search history.

(56) References Cited

U.S. PATENT DOCUMENTS

| | | | |
|---|---|---|---|
| 6,838,160 B2 | 1/2005 | Sasaki et al. | |
| 9,433,933 B2 | 9/2016 | Sambandan et al. | |

(Continued)

FOREIGN PATENT DOCUMENTS

| | | |
|---|---|---|
| CN | 106732694 A | 5/2017 |
| CN | 107311227 A | 11/2017 |

(Continued)

OTHER PUBLICATIONS

Li et al, Synthesis and intercalation properties of nanoscale layered tetratitanate, J Mater Chem, 12, 1796-1799 (Year: 2002).*

(Continued)

*Primary Examiner* — Stefanie J Cohen
(74) *Attorney, Agent, or Firm* — Maschoff Brennan; Brent A. Johnson; David W. Old

(57) ABSTRACT

Described herein are heterogeneous materials comprising a mixture of a first n-type semiconductor and a second n-type semiconductor. The first n-type semiconductor may be a single or plural phase $TiO_2$ material. The second n-type semiconductor includes a metal titanate and/or a noble metal. Upon activation with ultraviolet light, the photocatalytic material mixtures described herein efficiently decompose volatile chemical compounds. Furthermore, the photocatalytic materials disclosed herein are observably more stable, relative to known semiconductor materials, to inactivation by deposition.

17 Claims, 7 Drawing Sheets

(51) Int. Cl.
  *B01J 21/06* (2006.01)
  *B01J 23/58* (2006.01)
(52) U.S. Cl.
  CPC ....... *B01J 23/58* (2013.01); *B01D 2255/1021* (2013.01); *B01D 2255/2022* (2013.01); *B01D 2255/20707* (2013.01); *B01D 2255/802* (2013.01); *B01D 2257/708* (2013.01); *B01D 2259/804* (2013.01)

(56) References Cited

U.S. PATENT DOCUMENTS

| | | | |
|---|---|---|---|
| 9,987,621 | B2 | 6/2018 | Fukumura et al. |
| 10,213,780 | B2* | 2/2019 | Sambandan ............. B01J 37/16 |
| 2007/0119497 | A1* | 5/2007 | Umemoto ........... H01L 51/4246 |
| | | | 136/252 |
| 2008/0119352 | A1 | 5/2008 | Kitaguchi |
| 2012/0199468 | A1* | 8/2012 | Cheng .................... B01J 35/004 |
| | | | 977/773 |
| 2016/0121319 | A1 | 5/2016 | Tokudome et al. |
| 2016/0129432 | A1 | 5/2016 | Ozaki et al. |
| 2017/0250031 | A1 | 8/2017 | Akiyama et al. |
| 2017/0267542 | A1 | 9/2017 | Yang et al. |
| 2017/0291170 | A1 | 10/2017 | Sambandan et al. |

FOREIGN PATENT DOCUMENTS

| | | | | |
|---|---|---|---|---|
| CN | 107427815 | A | 12/2017 | |
| CN | 107586118 | A | 1/2018 | |
| JP | 2001276621 | A * | 10/2001 | |
| JP | 2007144403 | A | 6/2007 | |
| JP | 2008155120 | A | 7/2008 | |
| WO | 2006077839 | A1 | 7/2006 | |
| WO | WO-2016040875 | A1 * | 3/2016 | ............... A61L 9/18 |
| WO | 2017061124 | A1 | 4/2017 | |

OTHER PUBLICATIONS

Yang et al, Preparation complex photocatalyst of modified TiO2/K2Ti6O13 by tungstosilicic acid and study its degradation of methyl orange (Year: 2010).*
JP-2001276621-A—English translation (Year: 2011).*
Boltersdorf et al, Flux Synthesis, Optical and Photocatalytic Properties of n-type Sn2TiO4: Hydrogen and Oxygen Evolution under Visible Light, Chem. Mater., 28, 8876-8889 (Year: 2016).*
Li et al, Study on Preparation and Performances of TiO2/Potassium Titanate Photocatalyst, 2nd International Conference on Bioinformatics and Biomedical Engineering, pp. 2853-2856 (Year: 2008).*
Allen, M.R. et al., Evolution of Physical and Photocatalytic Properties in the Layered Titanates A2Ti4O9 (A=K, H) and in Nanosheets Derived by Chemical Exfoliation, Chemistry of Materials, 22(3), 1220-1228, Feb. 2010.
Cheng, S., From layer compounds to catalytic materials, Catalysis Today, 49, 303-312, Feb. 1999.
Uchida, S. et al., Intercalation of titanium oxide in layered H2Ti4O9 and H4Nb6O17 and photocatalytic water cleavage with H2Ti4O9/(TiO2, Pt) and H4Nb6O17/(TiO2, Pt) nanocomposites, Journal of the Chemical Society, Faraday Transactions, 93(17), 3229-3234, 1997.
Xiong, Z. et al., Titanate@TiO2 core-shell nanobelts with an enhanced photocatalytic activity, Journal of Materials Chemistry A, 1(26), 7738-7744, 2013.
Liang, Y. et al., Facile hydrothermal synthesis of nanocomposite Ag@ AgCl/K2Ti4O9 and photocatalytic degradation under visible light irradiation, Journal of Molecular Catalysis A: Chemical, 383, 231-238, Mar. 2014.
Junior, M.A.M. et al., Boosting the solar-light-driven methanol production through CO2 photoreduction by loading Cu2O on TiO2-pillared K2Ti4O9, Microporous and Mesoporous Materials, 234, 1-11, Nov. 2016.
Bessekhouad, Y. et al., Bi2S3/TiO2 and CdS/TiO2 heterojunctions as an available configuration for photocatalytic degradation of organic pollutant, Journal of Photochemistry and Photobiology A: Chemistry, 163(3), 569-580, May 2004.
Xiong, Z. et al., Nitrogen-Doped Titanate-Anatase Core-Shell Nanobelts with Exposed {101} Anatase Facets and Enhanced Visible Light Photocatalytic Activity, Journal of the American Chemical Society, 134(13), 5754-5757, Apr. 2012.
Xiong, Z. et al., Nitrogen-Doped Titanate-Anatase Core-Shell Nanobelts with Exposed {101} Anatase Facets and Enhanced Visible Light Photocatalytic Activity, Journal of the American Chemical Society, 134(13), 5754-5757, Apr. 2012, Supporting Information S1-S4.
Suzuki, S. et al., Growth of ultralong potassium titanate whiskers by the KCl flux method with metallic titanium materials, CrystEngComm, 14(12), 4176-4180, 2012.
Yu, Z. et al., A novel K2Ti8O17 nanorod photocatalyst rich in surface OH groups for efficient hydrogen production by splitting, International Journal of Hydrogen Energy, 43(39), 18115-18124, Sep. 2018.
Langhammer, C. et al., Plasmonic properties of supported Pt and Pd nanostructures, Nano letters, 6(4), 833-838, Apr. 2006.
International Search Report and Written Opinion, PCT/US2019/038652, dated Sep. 26, 2019.
Office Action in corresponding Japanese application, 2020-572862. 2, dated Feb. 8, 2022, English machine translation also attached.
Office Action in corresponding Taiwanese application, 108122591, dated May 16, 2022, English machine translation also attached.
Office Action in corresponding Korean application, 10-2021-7002703, dated Jul. 6, 2022, English machine translation also attached.
Saito, K. et al. "Unprecedentedly enhanced solar photocatalytic activity of a layered titanate simply integrated with TiO2 nanoparticles", Phys. Chem. Chem. Phys., 18, issued on Sep. 6, 2016, pp. 30920-30925.

* cited by examiner

ULTRAVIOLET ACTIVATED PHOTOCATALYTIC MATERIALS; THEIR USE IN VOLATILE COMPOUND DECOMPOSITION

CROSS-REFERENCE TO RELATED APPLICATIONS

This application is a national phase application of PCT/US2019/038652, filed on Jun. 24, 2019, which claims the benefit of U.S. Provisional Application Nos. 62/690,777, filed Jun. 27, 2018, and 62/725,104, filed Aug. 30, 2018, which are incorporated by reference in their entirety.

FIELD

The current disclosure describes heterogeneous n-type semiconductor materials useful in ultraviolet activated photocatalytic applications.

BACKGROUND

Titanium dioxide ($TiO_2$), and other titanium-based semiconductors have photocatalytic properties. The energy required to activate these materials is usually in the ultraviolet region of the electromagnetic spectrum. Ultraviolet activated photocatalytic materials, such as $K_2Ti_4O_9$, can have higher redox potentials than that of volatile organic compounds (VOC). Thus, activated photocatalysts can enable the oxidative decomposition of VOCs, such as toluene, to $CO_2$ and $H_2O$. It is believed that this is due to wider band gaps and/or deeper valance band positions of the photocatalytic materials as compared to the VOC materials. Many titanium-based photocatalytic materials, however, do not show the desired level of photocatalytic activity necessary for the complete oxidative decomposition of VOCs. Furthermore, many titanium-based photocatalysts have the disadvantage of surface carbonization during photocatalysis, which is believed to be responsible for the deactivation of titanium-based photocatalysts. Due to these shortcomings, these materials have not been widely explored for the removal of trace quantity of VOCs in the treatment of air.

There is a need for improved photocatalysts for the decomposition of volatile organic compounds. There is also a need for photocatalytic materials that have improved durability.

SUMMARY

The current disclosure relates to photocatalytic materials that comprises a mixture of a first n-type semiconductor and a second n-type semiconductor. In some embodiments the first n-type semiconductor can be a plural phase n-type semiconductor. The plural phase n-type semiconductor can comprise an anatase phase and a rutile phase n-type semiconductor. In some embodiments, the plural phase n-type semiconductor can be 83% anatase phase $TiO_2$ and 17% rutile phase $TiO_2$, e.g., P25 (Evonik). In some embodiments, the single phase n-type semiconductor can be an anatase phase n-type semiconductor, e.g., ST-01. Some embodiments include a second n-type semiconductor that comprises a mixed titanite, having the formula $K_2Ti_nO_{(2n+1)}$, where n=2, 4, 6, or 8. In some embodiments, the first n-type semiconductor and the second n-type semiconductor are present in the weight ratio of about 40 wt % to about 60 wt % of first n-type semiconductor, and about 60 wt % to about 40 wt % of second n-type semiconductor. In some embodiments, the semiconductors can be a physical mixture of discreet particles. In some embodiments, the photocatalytic material can further comprise a noble metal. In some embodiments, the second n-type semiconductor is doped with the noble metal. In some embodiments the noble metal may be rhodium, ruthenium, palladium, silver, osmium, platinum or gold. In some embodiments, the weight ratio of the noble metal can be about 0.001 wt % to about 1.0 wt %.

The mixture of two n-type semiconductors may have a deeper valence band than that of $TiO_2$ itself, wherein the semiconductors are either in physical or chemical contact for charge carrier communication with each other. These semiconductor materials can be used to enhance the ultraviolet activity of photocatalytic materials and/or to improve durability (i.e. maintain photocatalytic activity over time). Photocatalytic materials are useful for having and/or enhancing anti-bacterial (light and dark) activity, anti-viral activity, decomposition of volatile organic compounds (VOCs), and/or dye discoloration in aqueous solutions.

Some such photocatalytic materials comprise: (a) a first n-type semiconductor, and (b) a second n-type semiconductor, wherein the first n-type semiconductor comprises about 40 wt % to 60 wt % of the photocatalytic material and the second n-type semiconductor comprises about 60 wt % to 40 wt % of the photocatalytic material such that the first n-type semiconductor and the second n-type semiconductor total about 100 wt % of the photocatalytic material.

Some embodiments include a method of decomposing volatile chemical compounds or VOCs utilizing the photocatalytic semiconductors of the current disclosure, which may be activated with an ultraviolet radiation source. In some embodiments, the photocatalysts described herein have improved performance and/or improved stability relative to semiconductors known in the art.

DETAILED DESCRIPTION

Figure 1:
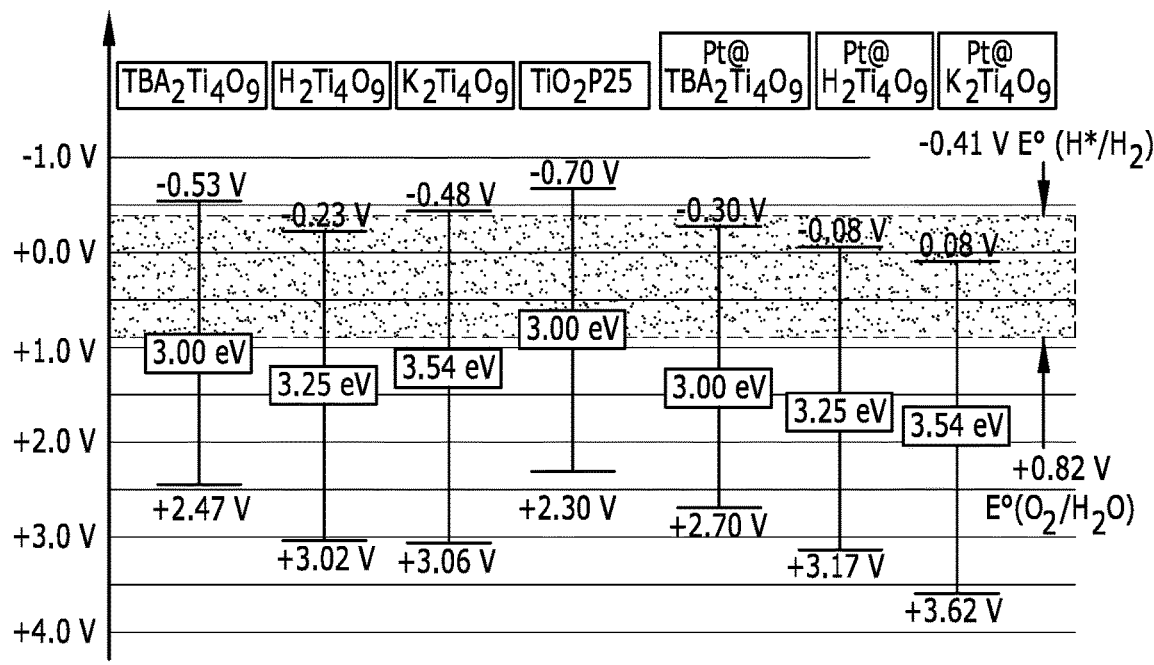
FIG. 1 is a schematic showing the relationship between conduction energy bands with valence energy bands for various materials.

Described herein are photocatalytic materials comprising mixtures of n-type semiconductors that are activated by ultraviolet light. Some embodiments include heterogeneous materials comprising a first n-type semiconductor and a second n-type semiconductor. In some embodiments, the photocatalytic materials described herein are useful for having and/or enhancing anti-bacterial activity, anti-viral activity, decomposition of volatile organic compounds (VOC), and/or dye discoloration in aqueous solutions.

In some embodiments, the photocatalytic material comprises a first n-type semiconductor and a second n-type semiconductor. In some examples, the first n-type semiconductor can comprise a plural phase n-type semiconductor. In some embodiments, the plural phase n-type semiconductor is $TiO_2$ comprising an anatase phase and a rutile phase. In some embodiments, the anatase phase can be about 2.5% to about 97.5%, about 2.5-5%, about 5-10%, about 10-15%, about 15-20%, about 20-25%, about 25-30%, about 30-35%, about 35-40%, about 40-45%, about 45-50%, about 50-55%, about 55-60%, about 60-65%, about 65-70%, about 70-75%, about 75-80%, about 80-85%, about 85-90%, about 90-95%, about 95-97.5%, or about 83% of the total weight of the plural n-type semiconductor. In some embodiments, the rutile phase can be about 2.5% to about 97.5%, about 2.5-5%, about 5-10%, about 10-15%, about 15-20%, about 20-25%, about 25-30%, about 30-35%, about 35-40%, about 40-45%, about 45-50%, about 50-55%, about 55-60%, about 60-65%, about 65-70%, about 70-75%, about 75-80%, about 80-85%, about 85-90%, about 90-95%, about 95-97.5%, or about 17% of the total weight of the plural n-type semiconductor. In some embodiments, the plural phase n-type $TiO_2$ semiconductor material is 80-90% anatase phase and 20-10% rutile phase. In some embodiments, the plural phase n-type $TiO_2$ semiconductor material is 87% anatase phase and 17% rutile phase. An example of a suitable material includes, but is not limited to, a $TiO_2$ mixture having the brand name P25 (83% anatase $TiO_2$+17% rutile $TiO_2$), sold by Evonik (Parsippany, N.J., USA).

In some embodiments, the first n-type semiconductor comprises a single phase n-type semiconductor. In some embodiments, the single phase n-type semiconductor can comprise substantially only anatase phase $TiO_2$. In some embodiments, for example, the anatase phase is greater than about 95 wt %, greater than about 96 wt %, greater than about 97 wt %, greater than about 97.5 wt %, greater than about 98 wt %, greater than about 98.5 wt %, or greater than 99.0 wt % of the total weight of the n-type semiconductor. An example of a suitable material includes, but is not limited to, anatase $TiO_2$ sold under the brand name ST-01 by Ishihara Sangyo Kaisha Ltd (Japan). In some embodiments, the anatase phase can be combustion synthesized $TiO_2$.

The second n-type semiconductor that is in the photocatalytic material can comprise a mixed titanate. The term "mixed titanate" refers to a compound that comprises Ti, O and at least another element; e.g., alkali metal ions, rare-earth metal ions, niobium and tantalum. Some metal ions include Ta, Nb, K, Ca, Cu, Mg, or La. In some embodiments, the mixed titanate can be, as non-limiting examples, $K_2Ti_4O_9$, $K_2Ti_6O_{13}$, $K_4Nb_6O_{17}$, $K_2La_2Ti_3O_{10}$ and/or $M_2Ti_nO_{2n+1}$ where M may be an alkali metal ion (e.g., K, Na, Li, Rb, etc.), and n can be ≥0.5, e.g., n=1, 2, 3, 4, 5, 6, 7, and/or 8. In some embodiments, M can be H. In some examples, M can be a tetraalkylammonium cation, e.g., tetrabutylammonium (TBA). In some embodiments, the mixed titanate can be combustion synthesized. In some examples, a mixed titanate may also be called a metal titanate. In some embodiments, the mixed titanate can be solid state synthesized. In some embodiments, the mixed titanate can be hydrothermally synthesized In some embodiments, the photocatalytic material can comprise a mixture of a first n-type semiconductor (anatase and/or rutile $TiO_2$), and a second n-type semiconductor (mixed titanate). In some embodiments, the mixture is a physical mixture. In some embodiments, the mixture can be of discreet separate particles of single or plural phase $TiO_2$ and/or mixed titanate particles. In some examples, the particles are in charge carrier communication. In some embodiments, the first n-type semiconductor (single phase and/or plural phase $TiO_2$) and the second n-type semiconductor (mixed titanate) can be substantially evenly dispersed throughout each other. A suitable method for achieving this dispersion is to sonicate or acoustically mix the particles for a sufficient time, such as 1-5 min, 5-10 min, 10-15 min, 15-20 min, 20-30 min, 30-60 min, 60-90 min, 3 min, or 30 min.

In some embodiments, the wt % ratio of the first plural phase n-type semiconductor (e.g. $TiO_2$) and the second n-type semiconductor (e.g. $K_2Ti_nO_{(2n+1)}$ such as $K_2Ti_4O_9$ or $K_2Ti_6O_{13}$) can be in the weight ratio of about 40-42 wt %, 42-44 wt %, 44-46 wt %, 46-48 wt %, 48-50 wt %, 50-52 wt %, 52-54 wt %, 54-56 wt %, 56-58 wt %, 58-60 wt %, 40-45 wt %, 45-50 wt %, 50-55 wt %, 55-60 wt %, 40-50 wt %, 50-60 wt %, or about 50 wt % of the plural phase n-type semiconductor to about 40-42 wt %, 42-44 wt %, 44-46 wt %, 46-48 wt %, 48-50 wt %, 50-52 wt %, 52-54 wt %, 54-56 wt %, 56-58 wt %, 58-60 wt %, 40-45 wt %, 45-50 wt %, 50-55 wt %, 55-60 wt %, 40-50 wt %, 50-60 wt %, or about 50 wt % of the second n-type semiconductor. In some embodiments, the weight percentage of the first plural phase n-type semiconductor and the weight percentage of the second n-type semiconductor totals 100 weight percent of the photocatalytic material. In some embodiments, the wt % ratio of the first single phase n-type semiconductor (e.g. $TiO_2$) and the second n-type semiconductor (e.g. $K_2Ti_nO_{(2n+1)}$ such as $K_2Ti_4O_9$ or $K_2Ti_6O_{13}$) can be in the weight ratio of about 40-42 wt %, 42-44 wt %, 44-46 wt %, 46-48 wt %, 48-50 wt %, 50-52 wt %, 52-54 wt %, 54-56 wt %, 56-58 wt %, 58-60 wt %, 40-45 wt %, 45-50 wt %, 50-55 wt %, 55-60 wt %, 40-50 wt %, 50-60 wt %, or about 50 wt % of the first single phase n-type semiconductor to about 40-42 wt %, 42-44 wt %, 44-46 wt %, 46-48 wt %, 48-50 wt %, 50-52 wt %, 52-54 wt %, 54-56 wt %, 56-58 wt %, 58-60 wt %, 40-45 wt %, 45-50 wt %, 50-55 wt %, 55-60 wt %, 40-50 wt %, 50-60 wt %, or about 50 wt % of the second n-type semiconductor. In some embodiments, the weight percentage of the first single phase n-type semiconductor and the weight percentage of the second n-type semiconductor totals 100 weight percent of the photocatalytic material.

In some embodiments, the photocatalytic material can comprise a noble metal. In some embodiments, the noble metal can be rhodium, ruthenium, palladium, silver, osmium, platinum or gold. In some embodiments the noble metal can be silver, gold or platinum. In some embodiments the noble metal can be platinum. In some embodiments, the weight ratio of the noble metal can be about 0.001 wt % to about 1.0 wt % of the total weight of the composite. In some embodiments, the weight ratio of the noble metal can be about 0.001-0.005 wt %, 0.005-0.01 wt %, about 0.01-0.015 wt %, about 0.015-0.02 wt %, about 0.02-0.025 wt %, about 0.025-0.03 wt %, about 0.03-0.035 wt %, about 0.035-0.04 wt %, about 0.04-0.045 wt %, about 0.045-0.05 wt %, about 0.05-0.055 wt %, about 0.055-0.06 wt %, about 0.06-0.065 wt %, about 0.065-0.07 wt %, about 0.07-0.075 wt %, about 0.075-0.08 wt %, about 0.08-0.085 wt %, about 0.085-0.09 wt %, about 0.09-0.095 wt %, about 0.095-0.01 wt %, about 0.1-0.15 wt %, about 0.15-0.2 wt %, about 0.2-0.25 wt %, about 0.25-0.3 wt %, about 0.3-0.35 wt %, about 0.35-0.4 wt %, about 0.4-0.45 wt %, about 0.45-0.5 wt %, about 0.5-0.55 wt %, about 0.55-0.6 wt %, about 0.6-0.65 wt %, about 0.65-0.7 wt %, about 0.7-0.75 wt %, about 0.75-0.8 wt %, about 0.8-0.85 wt %, about 0.85-0.9 wt %, about 0.9-0.95 wt %, about 0.95-1 wt %, about 0.001-0.1 wt %, about 0.1-0.2 wt %, about 0.2-0.3 wt %, about 0.3-0.4 wt %, about 0.4-0.5 wt %, about 0.5-0.6 wt %, about 0.6-0.7 wt %, about 0.7-0.8 wt %, about 0.8-0.9 wt %, about 0.9-1 wt %, about 0.001-0.3 wt %, about 0.3-0.6 wt %, about 0.6-1 wt %, about 0.03 wt %, about 0.075 wt %, about 0.15 wt %, or about 0.35 wt % of the total weight of the composite.

In some embodiments, the second n-type semiconductor of the photocatalytic material can be doped with a noble metal. In some embodiments, the doped second n-type semiconductor is a metal titanate doped with a noble metal. In some embodiments, the metal titanate can be $K_2Ti_nO_{(2n+1)}$. In some embodiments, the metal titanate comprises $K_2Ti_4O_9$ or $K_2Ti_6O_{13}$, and the noble metal comprises silver, gold or platinum. In some embodiments, the metal titanate is $K_2Ti_4O_9$, and the noble metal is platinum. In some embodiments, the metal titanate is $K_2Ti_6O_{13}$, and the noble metal is platinum. In some embodiments, the weight ratio of the noble metal can be about 0.001 wt % to about 1.0 wt % of the total weight of the second n-type semiconductor. In some embodiments, the weight ratio of the noble metal (such as gold, silver, or platinum) can be about 0.001-0.005 wt %, 0.005-0.01 wt %, about 0.01-0.015 wt %, about 0.015-0.02 wt %, about 0.02-0.025 wt %, about 0.025-0.03 wt %, about 0.03-0.035 wt %, about 0.035-0.04 wt %, about 0.04-0.045 wt %, about 0.045-0.05 wt %, about 0.05-0.055 wt %, about 0.055-0.06 wt %, about 0.06-0.065 wt %, about 0.065-0.07 wt %, about 0.07-0.075 wt %, about 0.075-0.08 wt %, about 0.08-0.085 wt %, about 0.085-0.09 wt %, about 0.09-0.095 wt %, about 0.095-0.01 wt %, about 0.1-0.15 wt %, about 0.15-0.2 wt %, about 0.2-0.25 wt %, about 0.25-0.3 wt %, about 0.3-0.35 wt %, about 0.35-0.4 wt %, about 0.4-0.45 wt %, about 0.45-0.5 wt %, about 0.5-0.55 wt %, about 0.55-0.6 wt %, about 0.6-0.65 wt %, about 0.65-0.7 wt %, about 0.7-0.75 wt %, about 0.75-0.8 wt %, about 0.8-0.85 wt %, about 0.85-0.9 wt %, about 0.9-0.95 wt %, about 0.95-1 wt %, about 0.001-0.1 wt %, about 0.1-0.2 wt %, about 0.2-0.3 wt %, about 0.3-0.4 wt %, about 0.4-0.5 wt %, about 0.5-0.6 wt %, about 0.6-0.7 wt %, about 0.7-0.8 wt %, about 0.8-0.9 wt %, about 0.9-1 wt %, about 0.001-0.3 wt %, about 0.3-0.6 wt %, about 0.6-1 wt %, about 0.03 wt %, about 0.075 wt %, about 0.15 wt %, or about 0.35 wt % of the total weight of the second n-type semiconductor.

Figure 1A:
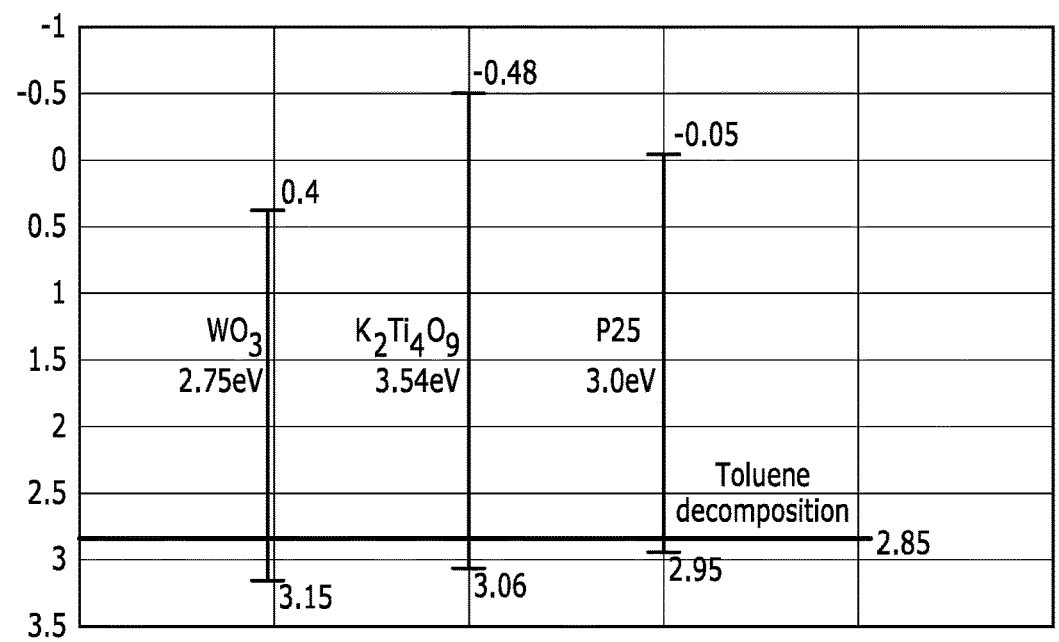
FIG. 1A is a schematic showing the relationship between conduction energy bands with valence energy bands for various materials.
Figure 2:
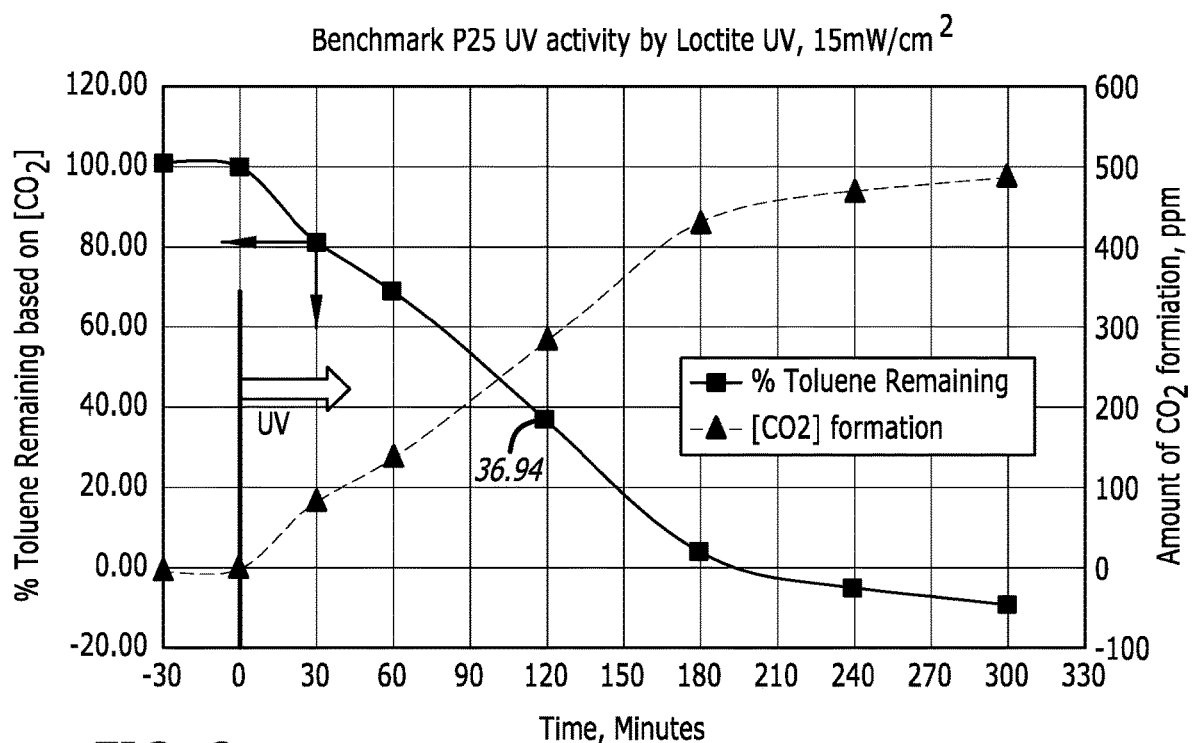
FIG. 2 is a graph showing the ultraviolet activated photocatalytic activity of CE-1 (P25 only) upon the gas toluene content over time.
Figure 3:
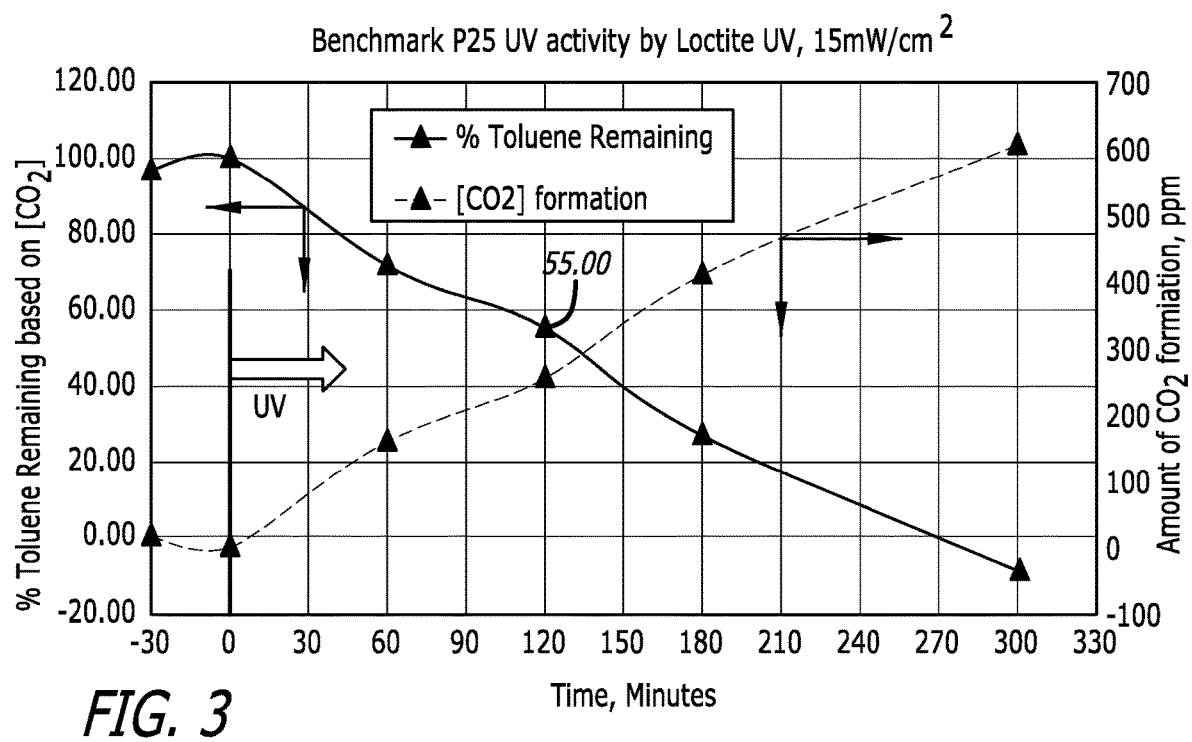
FIG. 3 is another graph showing the ultraviolet activated photocatalytic activity of CE-1 (P25 only) upon the gas toluene content over time.
Figure 4:
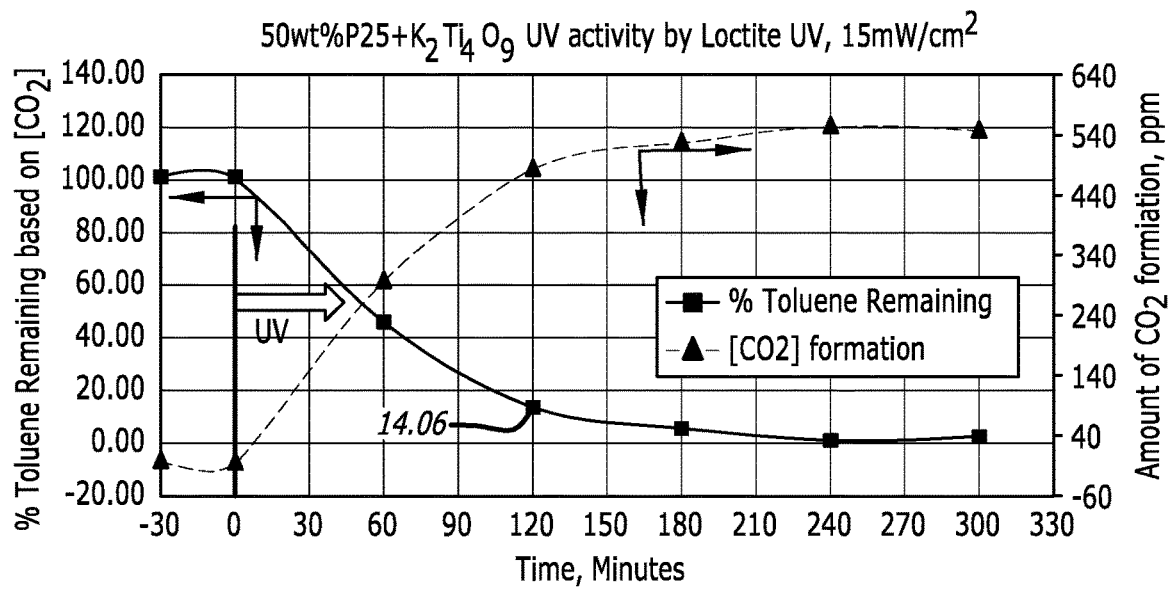
FIG. 4 is a graph showing the ultraviolet activated photocatalytic activity of Ex-A (50 wt % P25:50 wt % undoped mixed titanate) upon the gas toluene content over time.
Figure 5:
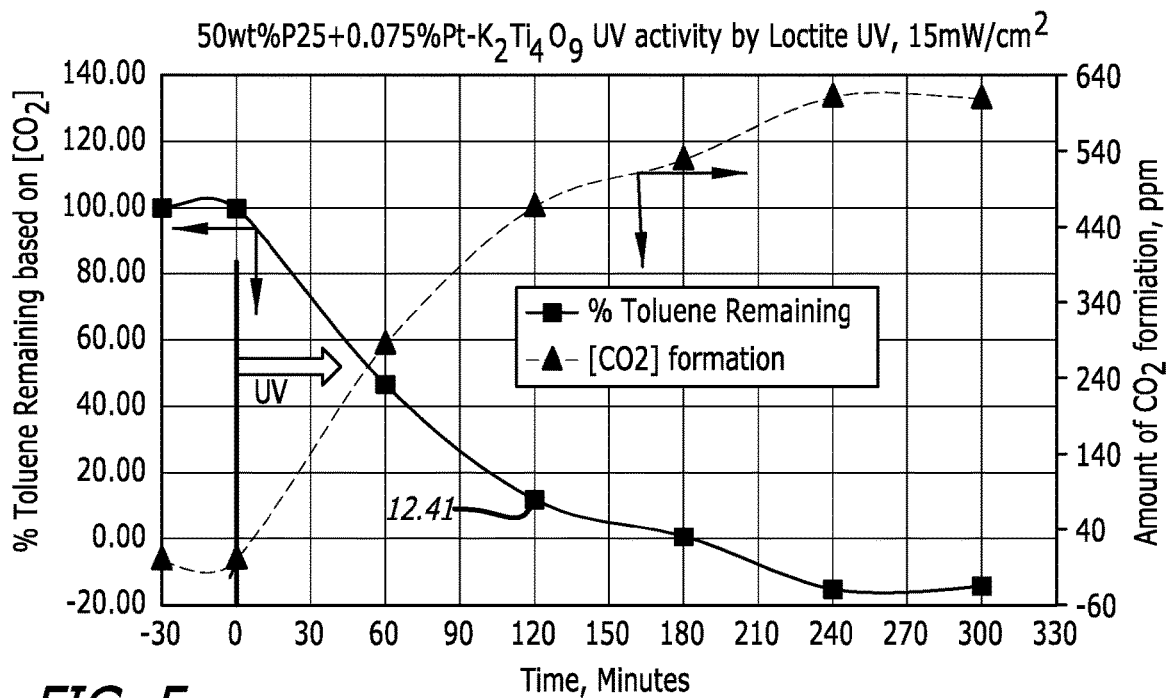
FIG. 5 is a graph showing the ultraviolet activated photocatalytic activity of Ex-2 (50 wt % P25:50 wt % mixed titanate:0.075 wt % Pt) upon the gas toluene content over time.
Figure 6:
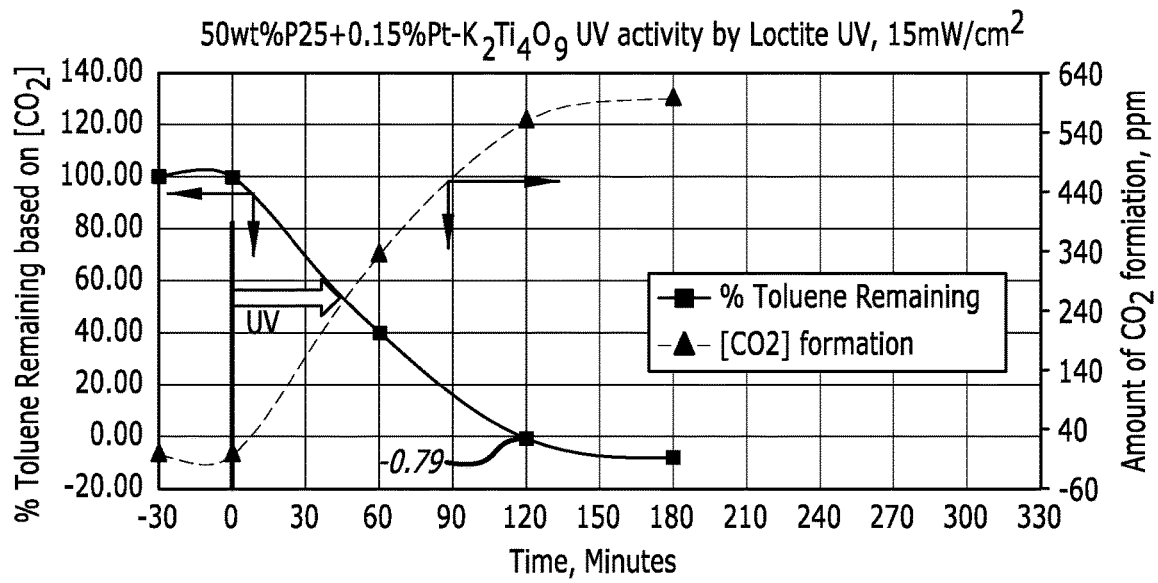
FIG. 6 is a graph showing the ultraviolet activated photocatalytic activity of Ex-2 (50 wt % P25:50 wt % mixed titanate:0.150 wt % Pt) upon the gas toluene content over time.
Figure 7:
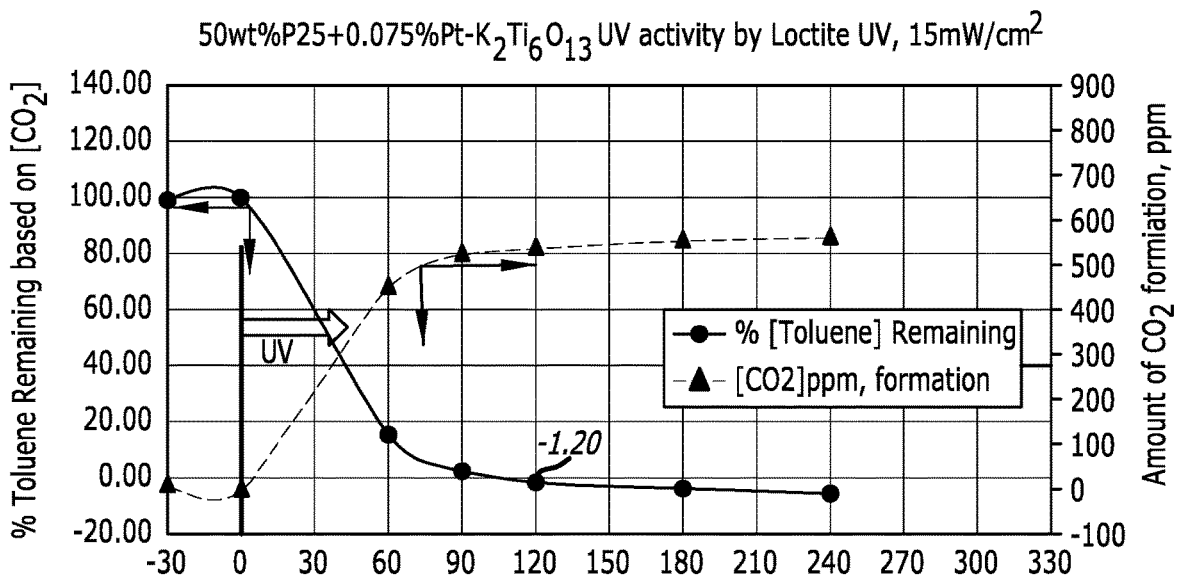
FIG. 7 is a graph showing the ultraviolet activated photocatalytic activity of Ex-2 (50 wt % P25:50 wt % mixed titanate:0.075 wt % Pt) upon the gas toluene content over time.
Figure 8:
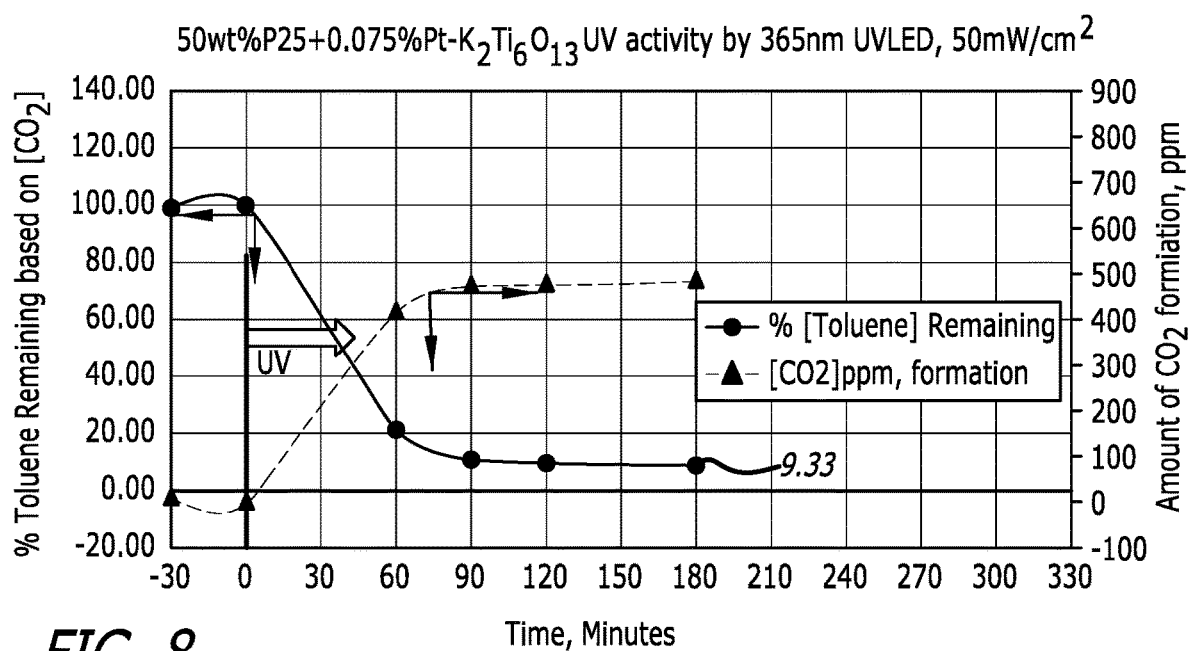
FIG. 8 is a graph showing the ultraviolet activated photocatalytic activity of Ex-2 (50 wt % P25:50 wt % mixed titanate:0.075 wt % Pt) upon the gas toluene content over time.

A conduction band is a range of electron energies high enough to free an electron from binding with its atom to move freely within the atomic lattice of the material as a "delocalized electron" (see FIGS. 1 and 1A). In semiconductors, the valence band is the highest range of electron energies in which electrons are normally present at absolute zero temperature. The valence electrons are substantially bound to individual atoms, as opposed to conduction electrons (found in semiconductors), which can move more freely within the atomic lattice of the material. On a graph of the electronic band structure of a material, the valence band is generally located below the conduction band, separated from it in insulators and semiconductors by a band gap. In some materials, such as conductors, the conduction band has substantially no discernible energy gap separating it from the valence band. The conduction and valence bands may actually overlap, for example, when the valence band level energy is higher or less negative than the conduction band level energy.

Various materials may be classified by their band gap; e.g., classified by the difference in energy between the valence band and conduction band. In non-conductors (e.g., insulators), the conduction band is much higher energy than the valence band, so it takes too much energy to displace the valence electrons to effectively conduct electricity. These insulators are said to have a non-zero band gap. In conductors, such as metals, that have many free electrons under normal circumstances, the conduction band overlaps with the valence band—there is no band gap—so it takes very little or no additional applied energy to displace the valence electrons. In semiconductors, the band gap is small, on the order of 200 nm to 1000 nm (on the order of 1.24 eV to 6.2 eV). This is believed to be the reason that it takes relatively little energy (in the form of heat or light) to make semiconductors' electrons move from the valence band to another energy level and conduct electricity; hence, the name semiconductor.

The photocatalytic materials described herein may be used for photochemical decomposition of a volatile organic compound. In the oxidation-reduction reaction of toluene and oxygen, the oxidation of toluene is coupled with the reduction of $O_2$. The oxidation potential of toluene is about 2.85 eV. The reduction potential of $O_2$ is about −0.05 eV. In some embodiments, as a result, a sufficiently large band gap, e.g., 2.85 eV and 0.05 eV which is about 2.90 eV, would be beneficial in achieving the aforementioned reaction. In addition, the relative positioning of the photocatalytic material's band gap is an important consideration. In some embodiments, the depth of the band gap should be relatively close to that of $TiO_2$, e.g., $K_2Ti_4O_9$ can be about at least about +2.85 eV. It is observed that noble metal doping of the metal titanate affects both the conductive band and the valence band of these materials. It is believed that the selection of photocatalytic material that takes these considerations into account provides an improved photocatalytic activity exhibited by the aforedescribed materials, e.g., $K_2Ti_4O_9$, $K_2Ti_6O_{13}$, and noble metal doped versions of $K_2Ti_4O_9$ and $K_2Ti_6O_{13}$.

In some embodiments, the described heterogeneous materials have photocatalytic activity. The heterogeneous materials can be anti-bacterial (light and dark); anti-viral; can decompose volatile organic compounds (VOC); and/or can discolor food additive dyes. Suitable non-limiting examples of food additive dyes include Natural Blue Colored powder (Color Maker, Anaheim, Calif., USA) and/or FD&C blue No. 2 synthetic food additive dye food additive dye (Synthetic blue colored powder, Chromatech, Inc., Michigan, USA).

The photocatalytic heterogeneous materials described herein can also increase the durability (time of effectiveness), and therefore maintain activity over time relative to other photocatalytic compositions.

Those of ordinary skill in the art recognize methods to determine whether a heterogeneous material decomposes volatile organic compounds (VOC's). In some embodiments, a method of decomposing a chemical compound comprises exposing the chemical compound to a photocatalyst comprising the homogeneous materials described herein in the presence of ultraviolet radiation. One example of determining whether the heterogeneous material decomposes volatile organic compounds can be by assessing the degradation of the organic compound under electromagnetic radiation, for example, ultraviolet radiation/light. In one embodiment, determining toluene degradation by measuring the decrease or percentage loss of the initial toluene concentration is one potential way to determine decomposition of the volatile organic compound; e.g., ranging from 0% loss to 100% loss over time. In another embodiment, determining toluene degradation by measuring the formation of carbon dioxide ($CO_2$), or percentage increase of the concentration of $CO_2$, is a potential way to determine the photocatalytic composition's properties with respect to decomposition of the volatile organic compound; e.g., ranging from 0% to 100% formation of $CO_2$ (based on the amount of carbon in initial toluene concentration) over time. A photocatalytic composition may be characterized with respect to its performance in a decomposition test, such as the decomposition of toluene. The time range for measurement of loss of toluene and/or formation of $CO_2$, can be from 1 minute to 10 hours, 1-5 min, 5-30 min, 30-60 min, 60-90 min, 90-120 min, 120-150 min, 150-180 min, 180-210 min, 210-240 min, 240-270 min, 270-300 min, 300-330 min, 330-360 min, 360-390 min, 390-420 min, 420-450 min, 450-480 min, 480-510 min, 510-540 min, 540-570 min, 570-600 min, 1 h, or 2 h. During the measurements, the photocatalytic material is exposed to ultraviolet light such as a UV LED of single wavelength 365 nm having 50 mW/cm² power or Loctite UV of broad wavelength between 300 and 420 nm having 15 mW/cm² power. In some embodiments, the degradation is at least 50%, 50-55%, 55-60%, 60-65%, 65-70%, 70-75%, 75-80%, 80-85%, 85-90%, 90-95%, 95-100%, or 100% of the initial amount of toluene after exposure to the UV activated heterogeneous material. In some embodiments, the formation of $CO_2$ is at least 50%, 50-55%, 55-60%, 60-65%, 65-70%, 70-75%, 75-80%, 80-85%, 85-90%, 90-95%, 95-100%, or 100% of the initial amount of toluene after exposure to the UV activated heterogeneous material.

Those of ordinary skill in the art recognize ways to determine whether a heterogeneous material discolors food additives or dyes. One example of determining the discoloration of food additive dyes can be by measuring the decrease or percentage loss of the initial amount of food dye additive over time. In one example, the food additive can be the natural anthocyanin food additive dye or an FDC food additive dye. In some embodiments, the discoloration of food dye additives can be from 0% to 60% after 5 hours under a blue LED emitting at 455 nm with 45 mW/cm² power. In some embodiments, the degradation is at least 25%, at least 30%, at least 40%, at least 50%, and/or at least 60% of the initial amount of the natural anthocyanin food additive dye after exposure to the heterogeneous material.

Figure 11:
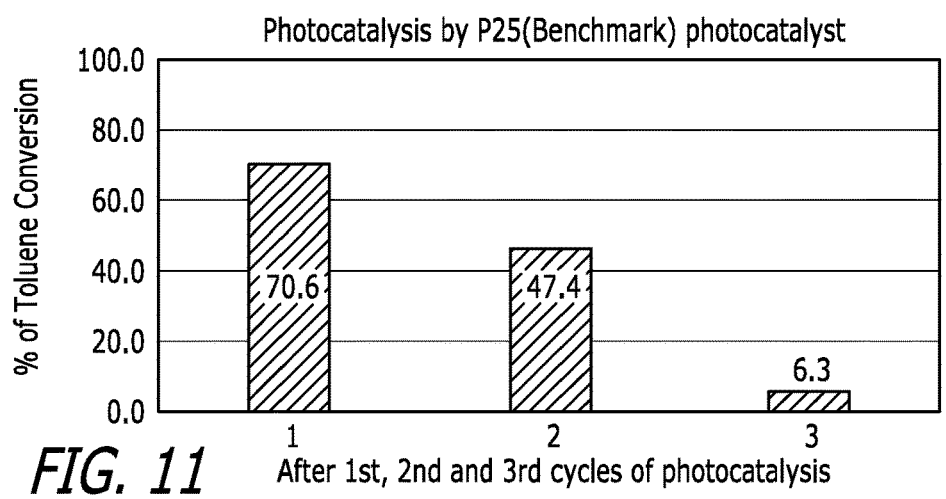
FIG. 11 is a graph showing the ultraviolet activated photocatalytic activity of CE-1 (P25) upon the gas toluene content over time.
Figure 12:
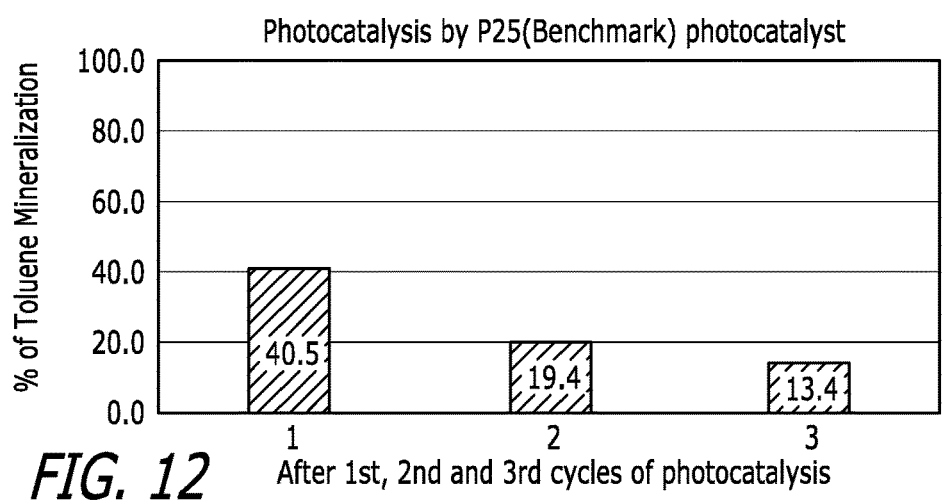
FIG. 12 is a graph showing the ultraviolet activated photocatalytic activity of CE-1 (P25) upon the gas $CO_2$ content over time.
Figure 13:
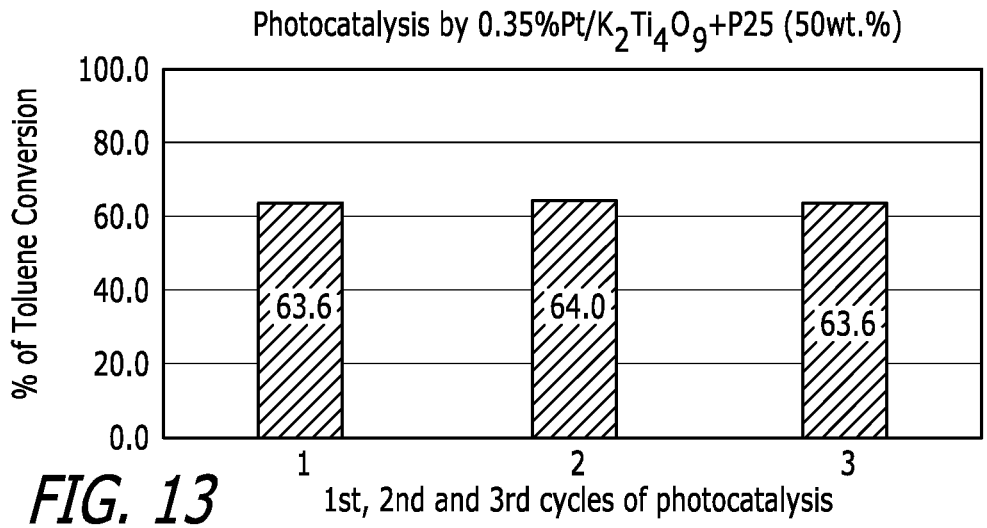
FIG. 13 is a graph showing the ultraviolet activated photocatalytic activity of Ex-AC (50 wt % P25:50 wt % mixed titanate:0.348 wt % Pt) upon the gas toluene content over time.
Figure 14:
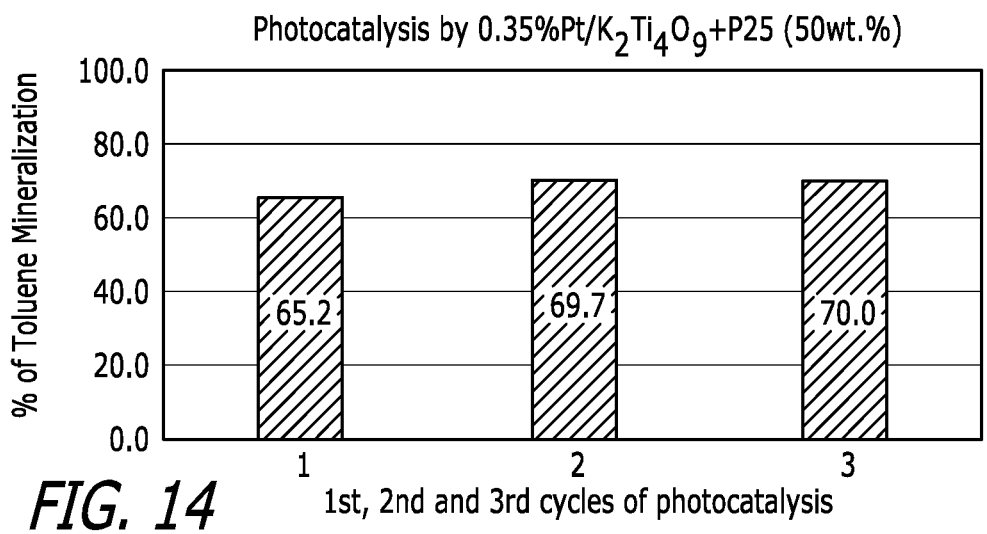
FIG. 14 is a graph showing the ultraviolet activated photocatalytic activity of Ex-AC (50 wt % P25:50 wt % mixed titanate:0.348 wt % Pt) upon the gas $CO_2$ content over time.

Those of ordinary skill in the art recognize ways to determine whether a heterogeneous photocatalytic material maintains an activity over time; e.g., the durability of the heterogeneous material. The photocatalytic decomposition of toluene was repeated for three cycles with no observed loss of activity when employing photocatalyst Ex-AC of the present disclosure (see FIGS. 13 and 14), while substantial loss of activity was observed when employing known photocatalyst P25 (see FIGS. 11 and 12).

In some embodiments, the retention of antibacterial activity may be observed after exposure to 85% relative humidity and 85° C. for at least 7 days.

Typical but non-limiting embodiments are as follows:

Embodiment 1. A photocatalytic material comprising:
  a. a first n-type semiconductor; and
  b. a second n-type semiconductor comprising a potassium titanate, and wherein the photocatalytic material comprises about 40 wt %-60 wt % of the first n-type semiconductor, about 60 wt %-40 wt % of the second n-type semi-conductor, and a total of 100 wt % of the first n-type semiconductor and the second n-type semiconductor.

Embodiment 2. The photocatalytic material of Embodiment 1, wherein the first n-type semiconductor is a plural phase n-type semiconductor.

Embodiment 3. The photocatalytic material of Embodiment 2, wherein the plural phase n-type semiconductor comprises an anatase phase and a rutile phase n-type semiconductor.

Embodiment 4. The photocatalytic material of Embodiment 1, wherein the first n-type semiconductor is a single phase n-type semiconductor.

Embodiment 5. The photocatalytic material of Embodiment 4, wherein the single phase n-type semiconductor is an anatase phase n-type semiconductor.

Embodiment 6. The photocatalytic material of embodiment 1, further comprising a noble metal.

Embodiment 7. The photocatalytic material of embodiment 6, wherein the noble metal is silver, gold or platinum.

Embodiment 8. The photocatalytic material of embodiment 6, wherein the weight ratio of the noble metal is about 0.0 wt % to about 1.0 wt %.

Embodiment 9. The photocatalytic material of embodiment 2, wherein the plural phase n-type semiconductor material is 80% to 90% anatase phase and 20% to 10% rutile phase.

Embodiment 10. The photocatalytic material of embodiment 2, wherein the plural phase n-type semiconductor is 83% anatase phase $TiO_2$ and 17% rutile phase $TiO_2$.

Embodiment 11. The photocatalytic material of embodiment 1, wherein the potassium titanate is $K_2Ti_4O_9$.

Embodiment 12. A method of decomposing a chemical compound, comprising exposing the chemical compound to a photocatalytic material of claim 1 in the presence of ultraviolet radiation.

EXAMPLES

Example 1(a). Synthesis of an n-Type Semiconductor (Ex-1) Aqueous Combustion Synthesis of $K_2Ti_4O_9$ 30 ml 50 wt % solution of Titanium(IV) bis(ammonium lactato)dihydroxide (titanium lactate [Tyzor LA], Sigma Aldrich, St. Louis, Mo., USA), 3 g potassium acetate (20% excess amount) (Sigma Aldrich, St. Louis, Mo., USA) and 5 g ammonium nitrate (Sigma Aldrich, St. Louis, Mo., USA) were dissolved in a glass beaker (250 mL volume). This clear solution was heated in the preheat muffle furnace at 500° C. until the combustion was over. The combustion reaction lasted for at least 15 minutes. Then, the voluminous powder was transferred to a fused silica container and then, the powder was annealed at 1000° C. for 12 hrs to get a single phase and crystalline $K_2Ti_4O_9$ powder.

Example 1(b). Synthesis of a Doped n-Type Semiconductor (Ex-2) Aqueous Combustion Synthesis of 0.348 wt % Pt in $K_2Ti_4O_9$ 30 g Tyzor LA (Titanium precursor), 3 g potassium acetate (20% excess amount) (Sigma Aldrich, St. Louis, Mo., USA), 0.0365 g platinum ammonium nitrate (Sigma Aldrich, St. Louis, Mo., USA) and 5 g ammonium nitrate (Sigma Aldrich, St. Louis, Mo., USA) were dissolved in a glass beaker (250 mL volume). This clear solution was heated in the preheat muffle furnace at 500° C. until the combustion was over. The combustion reaction lasted for at least 15 minutes. Then, the voluminous powder was transferred to fused silica container and then, the powder was annealed at 1000° C. for 12 hrs to get a Pt doped $K_2Ti_4O_9$ powder.

Example 1(c). Synthesis of a Doped n-Type Semiconductor (Ex-3) Aqueous Combustion Synthesis of 0.15 wt % Pt in $K_2Ti_4O_9$ 30 g Tyzor LA (Titanium precursor), 3 g potassium acetate (20% excess amount), 0.0183 g platinum ammonium nitrate and 5 g ammonium nitrate were dissolved in a glass beaker (250 mL volume). This clear solution was heated in the preheat muffle furnace at 500° C. until the combustion was over. The combustion reaction lasted for at least 15 minutes. Then, the voluminous powder was transferred to fused silica container and then, the powder was annealed at 1000° C. for 12 hrs to get a Pt doped $K_2Ti_4O_9$ powder.

Example 1(d). Synthesis of a Doped n-Type Semiconductor (Ex-4) Aqueous Combustion Synthesis of 0.075 wt % Pt in $K_2Ti_4O_9$ 30 g Tyzor LA (Titanium precursor), 3 g potassium acetate (20% excess amount), 0.00938 g platinum ammonium nitrate and 5 g ammonium nitrate were dissolved in a glass beaker (250 mL volume). This clear solution was heated in the preheat muffle furnace at 500° C. until the combustion was over. The combustion reaction lasted for at least 15 minutes. Then, the voluminous powder was transferred to fused silica container and then, the powder was annealed at 1000° C. for 12 hrs to get a Pt doped $K_2Ti_4O_9$ powder Example 1(e). Synthesis of a Doped n-Type Semiconductor (Ex-5) Aqueous Combustion Synthesis of 0.03 wt % Pt in $K_2Ti_4O_9$ 30 g Tyzor LA (Titanium precursor), 3 g potassium acetate (20% excess amount), 0.00469 g platinum ammonium nitrate and 5 g ammonium nitrate were dissolved in a glass beaker (250 mL volume). This clear solution was heated in the preheat muffle furnace at 500° C. until the combustion was over. The combustion reaction lasted for at least 15 minutes. Then, the voluminous powder was transferred to fused silica container and then, the powder was annealed at 1000° C. for 12 hrs to get a Pt doped $K_2Ti_4O_9$ powder Example 1(f). Synthesis of a Doped n-Type Semiconductor (Ex-6) Aqueous Combustion Synthesis of 0.075 wt % Pt in $K_2Ti_6O_{13}$ Tyzor LA (Titanium precursor), 2 g potassium acetate (20% excess amount), 0.007 g platinum ammonium nitrate and 5 g ammonium nitrate were dissolved in a glass beaker (250 mL volume). This clear solution was heated in the preheat muffle furnace at 430° C. until the combustion was over. The combustion reaction lasted for at least 15 minutes. Then, the voluminous powder was transferred to an alumina container. The powder was then annealed at 1000° C. for 12 hrs to get a Pt doped $K_2Ti_6O_{13}$ powder Example 2(a). Synthesis of an n-Type Semiconductor Physical Mixture (Ex-A) Acoustic Mixing of $K_2Ti_4O_9$ & $TiO_2$ (P 25)

About 0.7 g undoped $K_2Ti_4O_9$ (Ex-1), made as described in Example-1(a) above, and 0.7 g $TiO_2$ (fumed $TiO_2$ sold under the name Aeroxide P 25, Evonik, Parsippany, N.J., USA) were mixed for 3 min using a setting of acoustic intensity 40% (Lab AM [Acoustic Mixer] Resodyn Acoustic Mixers, Inc., Butte, Mont., USA). 130 mg of the mixed powder was sonicated in 2.6 g water in a water bath for 30 min. Then, the 130 mg of the suspended powder was dispersed in a petri dish of 60 mm*15 mm while evaporating at 120° C.

Synthesis of n-Type Semiconductor Physical Mixtures (Ex-AA, Ex-AB, Ex-AC)

Physical mixtures Ex-AA, Ex-AB, Ex-AC, respectively, were made in a similar manner as that described regarding Ex-A above, except that different doped levels of Pt $K_2Ti_4O_9$ (e.g., Ex-AA [0.075 wt % Pt], Ex-AB [0.15 wt % Pt], Ex-AC [0.35 wt % Pt]) were used instead of undoped $K_2Ti_4O_9$ as in Ex-A (see Table 1).

Ex-BA was made in a similar manner as that described regarding Ex-A above, except that a different doped titanate, e.g., $K_2Ti_6O_{13}$ (0.075 wt % Pt doped, see Ex-6) was used instead of $K_2Ti_4O_9$ (see Table 1).

Ex-CA was made in a similar manner as that described regarding Ex-A above, except that a different first n-type semiconductor material (ST-01) was used instead of P 25. In addition, 0.15 wt % Pt doped $K_2Ti_4O_9$ (EX-3) was used as the second n-type material (see Example 2(b) and Table 1).

Ex-2A, Ex-3A and Ex-6A were made in similar manner as that described regarding Ex-A above, except that only the doped titanate (no first n-type semiconductor material, e.g., P 25) was in the sonicated sample.

Example 2(b). Synthesis of an n-Type Semiconductor Physical Mixture (Ex-CA) Acoustic Mixing of $K_2Ti_4O_9$ & $TiO_2$ (ST-01)

About 0.7 g $K_2Ti_4O_9$ made as described in Example-1(c) above and 0.7 g $TiO_2$ (ST-01) were mixed for 3 min using acoustic method (Resodyn). 130 mg of the mixed powder was sonicated in 2.6 g water in a water bath for 30 min. Then, the 130 mg of the suspended powder was dispersed in a petri dish of 60 mm*15 mm while evaporating at 120° C.

Example 2(c). Comparative Example 1 (CE-1) Synthesis of an P25 Only Semiconductor Dispersion CE-1 (P 25, Evonik) was prepared without additional purification in a manner similar to that of Example 2(a), except that no $K_2Ti_4O_9$ was added to the powder to be dispersed.

Example 2(d). Comparative Example 1 (CE-2) Synthesis of an ST-01 Only Semiconductor Dispersion CE-2 (ST-01) was prepared without additional purification in a manner similar to that of Example 2(a), except that no $K_2Ti_4O_9$ was added to the powder to be dispersed.

Example 3. Experimental Set-Up 1 for Photocatalysis (Ex-1A and CE-1)

Figure 9:
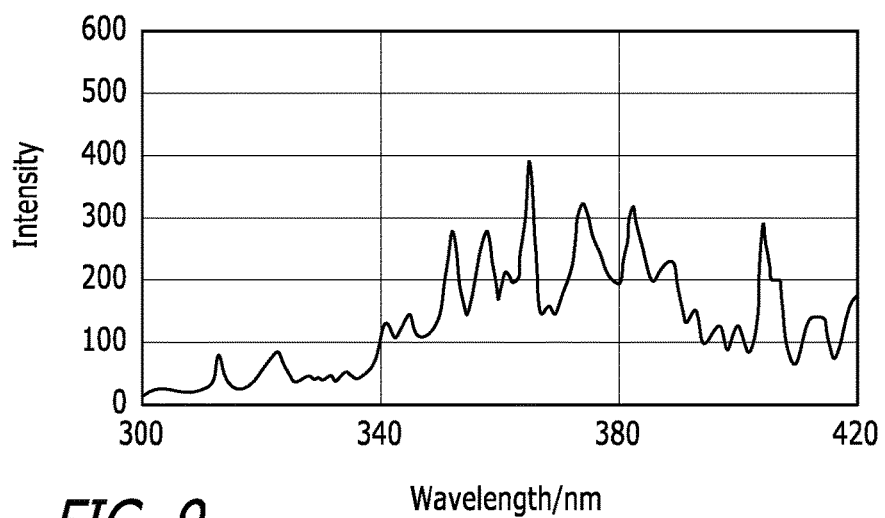
FIG. 9 is a graph showing the UV emission spectra of the Loctite UV source.

The petri dish was sealed in 5 L Tedlar bag and the bag was filled with 2.5 L air (1 L/1 min for 2 min 30 sec). To this about 16 mL of toluene vapor from the headspace of toluene bottle was injected. Initial and final toluene concentrations were estimated using GASTEC tube (122 L) and during the photocatalysis, $CO_2$ was monitored using PP system. Loctite UV source with 15 mW/cm$^2$ power was used to study UV photodecomposition of Toluene. The wavelength region between 300 and 420 nm was used from Loctite UV source (see FIG. 9 for Loctite UV emission spectra). The results are shown in FIGS. 2-8 and summarized in Table 1 below.

TABLE 1

| Pcat System (~130 mg) | % Toluene Remaining after 2 hrs, Loctite UV of 15 mW/cm$^2$ |
|---|---|
| P25 (CE-1) | 36.94 |
| ST-01 (CE-2) | 13.08 |
| 50 wt % P25 + 50 wt % 0.075 wt % Pt in $K_2Ti_4O_9$ (Ex-AA) | 12.41 |
| 50 wt % P25 + 50 wt % 0.15 wt % Pt in $K_2Ti_4O_9$ (Ex-AB) | ≤0 |
| 50 wt % P25 + 50 wt % 0.35 wt % Pt in $K_2Ti_4O_9$ (Ex-AC) | ≤0 |
| 50 wt % P25 + 50 wt % 0.075 wt % Pt in $K_2Ti_6O_{13}$ (Ex-BA) | ≤0 |
| 50 wt % ST-01 + 50 wt % 0.15 wt % Pt in $K_2Ti_4O_9$ (Ex-CA) | ≤0 |

Example 4. Experimental Set-Up 2 for Photocatalysis (Ex-AC)

Figure 10:
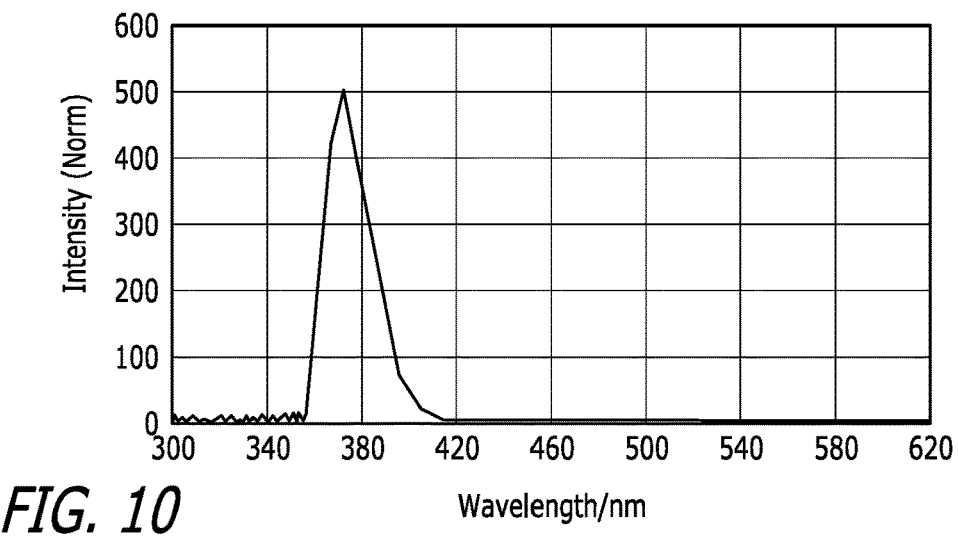
FIG. 10 is a graph showing the UV emission spectra of a UV light emitting diode source.

The petri dish was sealed in 5 L Tedlar bag and the bag was filled with 2.5 L air (1 L/1 min for 2 min 30 sec). To this about 16 mL of toluene vapor from the headspace of toluene bottle was injected (about 110 ppm of toluene). Initial and final toluene concentrations were estimated using GASTEC tube (122 L) and during the photocatalysis, $CO_2$ was monitored using PP system. UV LED (20 Watt UV LED, Larson Electronics, Kemp, Tex., USA) source with 50 mW/cm$^2$ power was used to study UV photodecomposition of Toluene. A first cycle of photocatalysis was performed for about 1 hour and the information recorded. The 5 L Tedlar bag was emptied and refilled with about 100 ppm of toluene. The exposure to the UV LED was repeated for another 1 hour period and the gas parameters recorded. The refilling and exposure to the UV LED was repeated a third time (third cycle) and the parameters recorded. The wavelength at about 365 nm was used from UV LED source (see FIG. 10 for UV LED emission spectra). The results are summarized in Tables 2 (Ex-AC) and 3 (P25 only [CE-1]) below and shown in FIGS. 11-14. For the CE-1 sample, it is believed that deactivation of the photocatalyst took place as evidenced by a yellow color visual observation in the sample, and intensification of the yellow color formation upon additional cycles. However, with the Ex-AC, no yellow color was observed in the sample during and after the test. It is believed this supports the stability of the Pt doped photocatalyst (Ex-AC) as compared with undoped P25 (CE-1).

TABLE 2

| (Ex-AC [50 wt % P 25 + 50 wt % 0.35 wt % Pt in $K_2Ti_4O_9$]) | | | |
|---|---|---|---|
| Cycle | 1 | 2 | 3 |
| Initial [toluene] | 110 ppm | 100 ppm | 110 ppm |
| Initial [$CO_2$] | 45.67 ppm | 115 ppm | 104 ppm |
| +1 hr [toluene] | 40 ppm | 36 ppm | 40 ppm |
| +1 hr [$CO_2$] | 548 ppm | 603 ppm | 642.7 ppm |

TABLE 3

| (CE-1 [P 25]) | | | |
|---|---|---|---|
| Cycle | 1 | 2 | 3 |
| Initial [toluene] | 68 ppm | 76 ppm | 64 ppm |
| Initial [$CO_2$] | 52.3 ppm | 36.5 ppm | 35 ppm |
| +1 hr [toluene] | 20 ppm | 40 ppm | 60 ppm |
| +1 hr [$CO_2$] | 245.3 ppm | 139.6 ppm | 95 ppm |

Example 5. Pre-Treatment for Photocatalysis 130 mg of each powdered sample was dispersed in a minimal amount of reverse-osmosis purified (RO) water (Ca. 1.5 mL) and homogenized for about 5 minutes in a bath sonication.

A clean petri dish was wiped with ethanol and the inside surface of the dish was ionized with a plasma device for 1 to 2 minutes. The homogeneous sample of each compound was poured into the treated petri dish and then heated at 120° C. while swirling to increase uniform distribution of the sample as it dried. After the sample had dried, the Petri Dish was placed under a UV Lamp (300 W) for 1 hour.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

The terms "a," "an," "the" and similar referents used in the context of describing the present disclosure (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the present disclosure and does not pose a limitation on the scope of any claim. No language in the specification should be construed as indicating any non-claimed element essential to the practice of the present disclosure.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the inventors for carrying out the present disclosure. Of course, variations on these described embodiments will become apparent to those of ordinary skill in the art upon reading the foregoing description. The inventor expects skilled artisans to employ such variations as appropriate, and the inventors intend for the present disclosure to be practiced otherwise than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

What is claimed is:

1. A photocatalytic material, comprising:
   (a) a first n-type semiconductor comprising $TiO_2$, and
   (b) a second n-type semiconductor comprising a potassium titanate doped with platinum, wherein the first n-type semiconductor comprises about 40 wt % to 60 wt % of the photocatalytic material and the second n-type semiconductor comprises about 60 wt % to 40 wt % of the photocatalytic material such that the first n-type semiconductor and the second n-type semiconductor total 100 wt % of the photocatalytic material.

2. The photocatalytic material of claim 1, wherein the first n-type semiconductor is a plural phase n-type semiconductor.

3. The photocatalytic material of claim 1, wherein the plural phase n-type semiconductor comprises $TiO_2$ in an anatase phase and $TiO_2$ in a rutile phase.

4. The photocatalytic material of claim 2, wherein the plural phase n-type semiconductor comprises about 83% anatase phase $TiO_2$ and about 17% rutile phase $TiO_2$.

5. The photocatalytic material of claim 1, wherein the first n-type semiconductor is a single phase n-type semiconductor.

6. The photocatalytic material of claim 5, wherein the single phase n-type semiconductor comprises $TiO_2$ in at least 90% anatase phase.

7. The photocatalytic material of claim 6, wherein the single phase n-type semiconductor comprises at least 95% anatase phase $TiO_2$.

8. The photocatalytic material of claim 1, wherein the second n-type semiconductor comprises a potassium titanate of formula $K_2Ti_nO_{(2n+1)}$, wherein n is 2, 4, 6, or 8.

9. The photocatalytic material of claim 8, wherein the potassium titanate comprises $K_2Ti_4O_9$.

10. The photocatalytic material of claim 8, wherein the potassium titanate comprises $K_2Ti_6O_{13}$.

11. The photocatalytic material of claim 1, wherein platinum is present in the second n-type semiconductor in an amount of 0.001 wt % to 1 wt %.

12. The photocatalytic material of claim 11, wherein platinum is present in the second n-type semiconductor in an amount of 0.075 wt % to 0.35 wt %.

13. A method for decomposing a volatile chemical compound, wherein the volatile chemical compound is exposed to the photocatalytic material of claim 1; and the photocatalytic material is activated with an ultraviolet radiation source.

14. The method of claim 13, wherein the ultraviolet radiation source has a wavelength region between 300 nm to 420 nm and a power of 15 $mW/cm^2$.

15. The method of claim 13, wherein the ultraviolet radiation source has a wavelength of 365 nm and a power of 50 $mW/cm^2$.

16. The method of claim 13, wherein the volatile chemical compound is toluene, and the photocatalytic material decomposes at least 85% of the toluene in 2 hours of exposure.

17. The method of claim 16, wherein the photocatalytic material maintains a consistent level of activity over at least three cycles of toluene exposure.

* * * * *